(12) United States Patent
Korczak et al.

(10) Patent No.: US 12,296,680 B2
(45) Date of Patent: May 13, 2025

(54) DISPLAY DEVICE

(71) Applicant: VALEO COMFORT AND DRIVING ASSISTANCE, Créteil (FR)

(72) Inventors: Stephane Korczak, Creteil (FR); Michael Irzyk, Creteil (FR); Ciprian Musat, Creteil (FR); Patrick Corduan, Creteil (FR); Nour Eddine El Ouardi, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 4 days.

(21) Appl. No.: 18/027,780

(22) PCT Filed: Sep. 21, 2021

(86) PCT No.: PCT/EP2021/075987
§ 371 (c)(1),
(2) Date: Mar. 22, 2023

(87) PCT Pub. No.: WO2022/063799
PCT Pub. Date: Mar. 31, 2022

(65) Prior Publication Data
US 2023/0339328 A1    Oct. 26, 2023

(30) Foreign Application Priority Data
Sep. 22, 2020 (FR) ...................................... 2009602

(51) Int. Cl.
*G06F 3/01* (2006.01)
*B60K 35/10* (2024.01)
(Continued)

(52) U.S. Cl.
CPC .............. *B60K 35/10* (2024.01); *G06F 3/016* (2013.01); *B60K 35/22* (2024.01); *B60K 35/25* (2024.01); *B60K 2360/145* (2024.01)

(58) Field of Classification Search
CPC ...... G06F 3/044; G06F 3/0416; G06F 3/0412; G06F 3/0443; G06F 3/0414;
(Continued)

(56) References Cited

U.S. PATENT DOCUMENTS

2006/0140437 A1   6/2006  Watanabe et al.
2010/0103640 A1*  4/2010  Brown ................ G06F 3/04142
                                                    361/829
(Continued)

FOREIGN PATENT DOCUMENTS

EP    1691263 A1   8/2006
EP    3637233 A1   4/2020
(Continued)

OTHER PUBLICATIONS

International Search Report and Written Opinion in corresponding International Application No. PCT/EP2021/075987, dated Mar. 2, 2022 (32 pages).

*Primary Examiner* — Dong Hui Liang
(74) *Attorney, Agent, or Firm* — Osha Bergman Watanabe & Burton LLP

(57) ABSTRACT

The invention relates to a display device (1) comprising: —a cover glass (10); —a back-lighting device (20), which is designed to generate a source light beam; —a modulator (12), which is securely fastened to the cover glass and located between said cover glass and the back-lighting device so as to receive the source light beam and to transmit a modulated light beam through the cover glass; and —at least one mechanical actuator (30); according to the invention, said mechanical actuator is placed so as to be able to move the cover glass with respect to the back-lighting device.

13 Claims, 2 Drawing Sheets

(51) Int. Cl.
*B60K 37/06* (2006.01)
*B60K 35/22* (2024.01)
*B60K 35/25* (2024.01)

(58) Field of Classification Search
CPC .. G06F 3/0446; G06F 3/0445; G06F 3/03547; G06F 3/0488; G06F 3/016; G06F 2203/04104; G06F 2203/04105; G06F 1/1656; B60K 2370/143; B60K 2370/1434; B60K 2370/158
See application file for complete search history.

(56) References Cited

U.S. PATENT DOCUMENTS

| | | | |
|---|---|---|---|
| 2011/0141052 A1* | 6/2011 | Bernstein | G06F 3/041 |
| | | | 341/5 |
| 2014/0339991 A1* | 11/2014 | Zhang | G09G 3/3406 |
| | | | 315/186 |
| 2016/0077550 A1* | 3/2016 | Zhang | G06F 3/0484 |
| | | | 715/765 |
| 2019/0085608 A1* | 3/2019 | Bomer | E05D 11/0081 |
| 2020/0026357 A1* | 1/2020 | Kirsch | G06F 3/043 |
| 2020/0224069 A1* | 7/2020 | Itoh | B32B 27/286 |

FOREIGN PATENT DOCUMENTS

| | | |
|---|---|---|
| KR | 20180078121 A | 7/2018 |
| WO | 2020157231 A1 | 8/2020 |

\* cited by examiner

[Fig. 1]
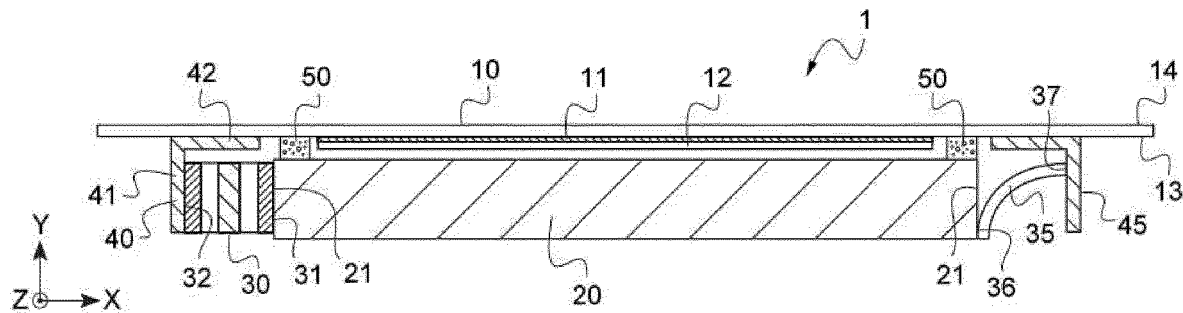
[Fig. 2]
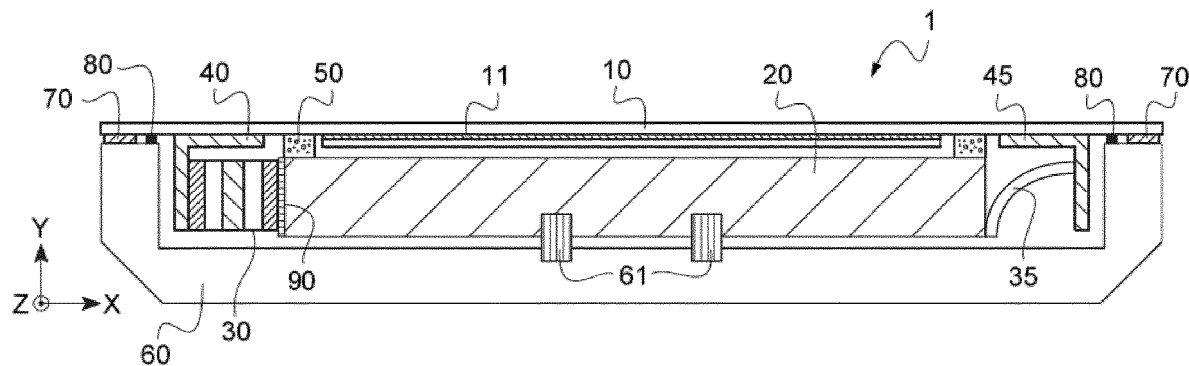
[Fig. 3]
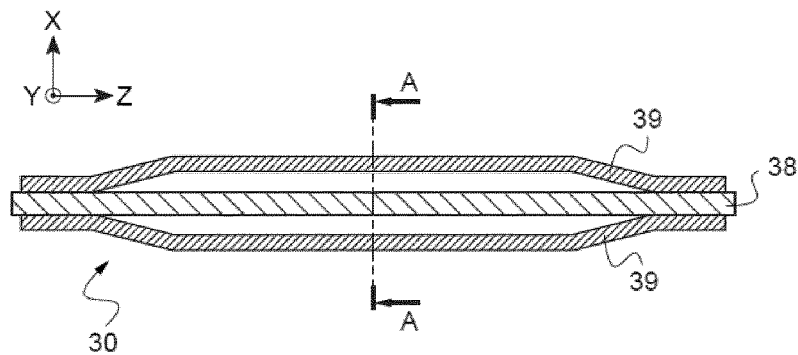

[Fig. 4]
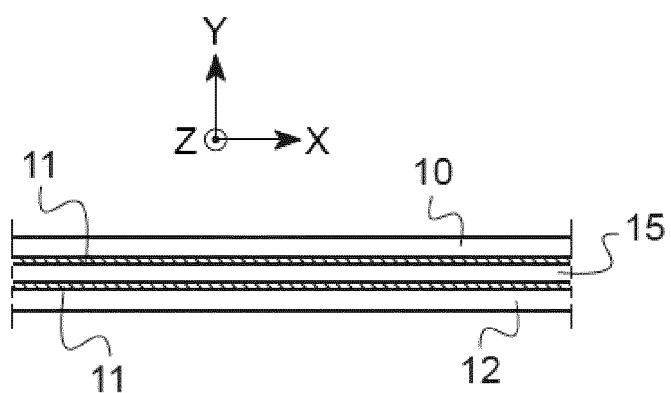

DISPLAY DEVICE

TECHNICAL FIELD OF THE INVENTION

The present invention relates in general to the field of information display devices, notably within vehicles (in particular motor vehicles).

It relates more particularly to a haptic feedback display device for a vehicle dashboard.

TECHNOLOGICAL BACKGROUND

Display devices that make use of screens are increasingly present in vehicles, notably motor vehicles. Integrated in the dashboard, the screens can be used to view information relating to the operation of the vehicle or to a route taken, for example air conditioning, radio or GPS. In addition, these screens often have a touch function and can then be used by a user, like an interface for interacting with the vehicle, this making it possible to dispense with pushbuttons.

Mounting these touchscreens in rubber assists with the addition of further services, such as haptic feedback after the screen has been pressed on.

To be correctly perceived by the user, the haptic feedback must satisfy certain constraints, such as a minimum displacement and/or minimum acceleration of the surface in contact with the user's finger. Conventionally, effective vibration is realized by using multiple mechanical actuators or large mechanical actuators.

However, the volume available for the integration of these screens in the dashboard is often limited.

DISCLOSURE OF THE INVENTION

Within this context, what is proposed according to the invention is a display device comprising a façade glass; a backlighting device, which is designed to generate a source light beam; a modulator, which is secured to said façade glass and is located between said façade glass and said backlighting device so as to receive said source light beam and to transmit a modulated light beam through said façade glass; and at least one mechanical actuator; said mechanical actuator being disposed so as to be able to displace said façade glass in relation to said backlighting device.

Thus, by virtue of the invention, the one or more mechanical actuators can move only a portion of the display device that comprises the façade glass and the modulator in relation to the backlighting device. It is therefore possible to not displace all of the display device to provide haptic feedback, but only a portion of it.

Consequently, the mass to be vibrated, that is to say to be displaced, is much smaller than the total mass of the display device. Since the mass to be displaced is small, it is possible to provide actuators of small size or fewer actuators, whilst still satisfying the constraints of minimum acceleration and displacement of the surface of the display device that is in contact with the user's finger.

In fact, it is possible to integrate such a display device as haptic feedback touchscreen in narrow spaces.

Other non-limiting and advantageous features of the display device according to the invention, taken individually or in any technically possible combination, are as follows:
said mechanical actuator is a piezoelectric actuator;
a first connection element that is fixed to said mechanical actuator by way of a first portion and to said façade glass by way of a second portion;
said first connection element has a profile forming two arms in the shape of a bracket, said mechanical actuator being fixed to a first arm and said façade glass being fixed to a second arm;
said modulator is adhesively bonded to said façade glass by an optical adhesive;
the display device moreover comprises: at least one second connection element fixed to said façade glass; and at least one spring which is in contact with said backlighting device by way of a first end and with said second connection element by way of a second end so as to prestress said mechanical actuator and/or to bring said façade glass to a position of equilibrium;
said second connection element has a bracket-shaped profile;
a protective element is disposed on the periphery of said backlighting device, between said backlighting device and said façade glass;
said backlighting device comprises a casing made of magnesium;
a Teflon surface is located between said mechanical actuator and said backlighting device;
said display device comprises a flexible element designed to connect said façade glass to a structure and to make it possible for said façade glass to move in relation to said structure;
said flexible element is made from a material belonging to the following group: silicone;
said flexible element is arranged so as to stay in an elastic deformation regime when said façade glass undergoes an acceleration of at least 6 G and a displacement of at least 100 micrometers in relation to said structure;
at least one sensor is disposed between said façade glass and said structure and is designed to measure a force exerted on said façade glass.

DESCRIPTION OF THE EMBODIMENTS

The following description with reference to the appended drawings, which are provided as non-limiting examples, will facilitate understanding of the invention and how it may be carried out.

Of course, the various features, variants and embodiments of the invention can be combined with one another in various combinations, as long as they are not mutually incompatible or mutually exclusive.

In the appended drawings:

FIG. 1 is a schematic view, in section, of a display device according to the invention;

FIG. 2 is a schematic view of the display device from FIG. 1, joined to a structure;

FIG. 3 is a schematic top view of a mechanical actuator of the display device from FIG. 1 or from FIG. 2; and FIG. 4 is a schematic view, in section, of a portion of a display device according to the invention.

Of course, various other modifications may be made to the invention within the scope of the appended claims.

The present document describes the case of a display device 1 being used as haptic feedback touchscreen within a motor vehicle, for example so that a user can view information relating to the operation of the vehicle and to interact with the vehicle. The display device 1 can, for example, be integrated in a dashboard of the vehicle. In this case, the display device 1 has an outer surface that faces the user, who is located in a passenger compartment of the vehicle. The outer surface is also designed for the user to make contact with it, in practice by way of the user's finger.

The display device 1 can, however, also be applied to any other conceivable use for a haptic feedback screen.

As shown in FIG. 1, the display device 1 comprises:
a façade glass 10;
a backlighting device 20;
a modulator 12; and
at least one mechanical actuator 30.

In the embodiment described, the façade glass 10 extends in a plane, referred to as reference plane. In this instance, the reference plane is the XZ plane in FIG. 1. Here, the façade glass 10 has the overall shape of a flattened parallelepiped, which notably means that its thickness, in this instance the dimension along the Y direction, is very clearly smaller than its width and its length, in this instance the two dimensions in the reference plane XZ. In the reference plane XZ, the façade glass 10 may, for example, have the dimensions of a 14 inch screen, for example a length of 31 cm, a width of 17.4 cm and a thickness of a few millimeters, for example from 1 mm to 5 mm. In practice, the shape of the façade glass 10 in the reference plane XZ can be adapted to the shape of the dashboard.

The façade glass 10 is a transparent or virtually transparent sheet of glass. Specifically, the façade glass 10 is designed so that a light beam can pass through it without deforming or substantially weakening. This light beam, referred to as modulated light beam, enters through a rear face 13 and emerges through a front face 14, opposite the rear face 13, toward the user. The modulated light beam makes it possible to transmit information, for example in the form of images, to the user, for example relating to the state of the vehicle. In this instance, the front face 14 corresponds to the outer surface of the display device 1.

The backlighting device 20 is designed to generate a source light beam toward the façade glass 10, more specifically toward the rear face 13 of the façade glass 10. As shown in FIG. 1, the backlighting device 20 has a parallelepipedal overall shape, the thickness of which is smaller than the width and than the length.

Here, the backlighting device 20 generates a polychromatic source light beam so as to form images in color for the user. As a variant, the backlighting device could generate a monochromatic source light beam so as to form monochromatic images.

Notably, it is possible to provide that the backlighting device 20 comprises a protective casing made of magnesium to increase its rigidity. To generate the source light beam, the backlighting device 20 may, for example, comprise light-emitting diodes.

The backlighting device 20 is located facing the façade glass 10 at a small distance from the façade glass 10, typically between 0.5 mm and 5 mm. In FIG. 1, that portion of the backlighting device 20 that faces the glass façade 10 is planar. As a variant, in order to be located as close as possible to the façade glass 10, this portion could have a reinforcement adapted to the shape of the modulator 12.

As shown in FIG. 1, the modulator 12 is located (that is to say interposed) between the backlighting device 20 and the façade glass 10. The modulator 12 has the form of a film which extends in the reference plane XZ. The modulator 12 is fixed to the façade glass 10. In this instance, the modulator 12 is adhesively bonded to the façade glass 10 by an optical adhesive 11, for example an optical resin, for example made of silicone. The modulator 12 is separated from the backlighting device 20 by a gap.

The modulator 12 is made up of a matrix of elements having a transmittance that varies over time. Each element of the matrix defines a pixel of the display device 1. The modulator 12 receives the source light beam and transmits the modulated light beam toward the façade glass 10. By virtue of its matrix of elements, the modulator 12 spatially modulates the source light beam so as to form the modulated light beam.

In this instance, the modulator 12 is a liquid crystal display of TFT ("thin film transistor") type, that is to say a matrix of liquid crystal cells each controlled by a thin film transistor (hence the name "TFT" display). For each pixel, three cells, each associated with a colored filter, for example one for blue, one for green and one for red, make it possible to control the transmittance stably and with a short response time by orienting the liquid crystals.

As a variant, the source light beam could be generated by micro LEDs or by organic light-emitting diodes.

The display device 1 described here comprises a single mechanical actuator 30. Of course, the display device 1 may comprise multiple mechanical actuators 30, which may be oriented in separate directions. However, the display device 1 makes it possible to realize effective haptic feedback with only one mechanical actuator 30, even a small one.

The mechanical actuator 30 is a part with a variable shape. The mechanical actuator 30 comprises two portions 31, 32 which are movable in relation to one another. The mechanical actuator 30 is disposed so as to be able to displace the façade glass 10 in relation to the backlighting device 20. To do this, a first portion 31 of the mechanical actuator 30 is in contact with the backlighting device 20, for example abuts it, and a second portion 32 of the mechanical actuator 30 is connected to the façade glass 10.

Thus, the façade glass 10 is movable in relation to the backlighting device 20. It is therefore possible to displace the façade glass 10 and the modulator 12 in relation to the backlighting device 20. Thus, it is possible, for example, to displace only the façade glass 10 and the modulator 12 in relation to an integral structure of the backlighting device 20, as explained below, that is to say without displacing the backlighting device 20.

Displacing the façade glass 10 with the modulator 12 and keeping them fixed in relation to one another makes it possible to not deteriorate the quality of the image intended for the user, even when displacements are occurring. This is because the optical adhesive 11 prevents, for example, the formation of air bubbles between the façade glass 10 and the modulator 12.

The mass to be vibrated to effect the haptic feedback, when the user touches the front face 14 of the façade glass 10, is therefore smaller than the mass of the display device 1.

Consequently, for a predetermined haptic performance, it is possible to provide a mechanical actuator 30 which is of smaller size than the size of a mechanical actuator that is necessary for vibrating the entire display device 1. It is also possible to provide, for a determined size of mechanical actuator, that fewer mechanical actuators 30 are used than are needed to vibrate the entire display device 1.

In this instance, the high rigidity of the protective casing makes it possible to transmit efficiently, that is to say without loss of energy, the movement of the mechanical actuator 30 to the façade glass 10 since the mechanical actuator 30 bears against this protective casing here. The movement of the mechanical actuator 30 is not absorbed by the backlighting device 20.

It is also possible to provide that the mechanical actuator 30 bears against another rigid surface, for example the dashboard of the vehicle. It is possible, for example, to provide that the mechanical actuator 30 bears against a structure 60 supporting the display device 1, as shown in FIG. 2.

Such a display device 1 is compact and can therefore be integrated easily into a vehicle dashboard. Such a display device 1 can also make it possible to reduce the manufacturing costs by using fewer mechanical actuators.

Here, an electric current can vary the length of the mechanical actuator 30, in this instance its dimension along the X direction. Thus, the mechanical actuator 30 can displace the façade glass 10, in relation to the backlighting device 20, in the reference plane XZ along the X direction.

As a variant, the electric current could vary the shape of the mechanical actuator along another direction of the reference plane or along a direction out of the reference plane, for example orthogonally to the reference plane.

As explained above, the display device 1 described here comprises a single mechanical actuator 30 for displacing the façade glass 10 in a direction, in this instance the X direction. Of course, it is possible to provide another mechanical actuator, oriented in another direction, for displacing the façade glass 10 in this other direction, for example the other direction of the reference plane XZ that is orthogonal thereto, therefore the Z direction here.

In this instance, the mechanical actuator 30 is a piezoelectric actuator. The advantages of a piezoelectric actuator are notably its small bulk and good haptic performance in terms of acceleration, displacement and force. As a variant, the mechanical actuator could be a magnetic actuator comprising a solenoid, a shape memory actuator or an artificial muscle.

As shown in FIG. 3, the piezoelectric actuator 30 comprises a central portion 38 made of piezoelectric ceramic. When an electric voltage is applied to the central portion 38, the latter contracts, in this instance along the Z axis. Under the effect of this contraction, two lateral portions 39, each fixed to the two ends of the central portion 38, elastically deform and move away from one another, in this instance along the X axis. Such a piezoelectric actuator 30 is referred to as "amplified" since the displacement of the lateral portions 39 along the X axis is greater than the deformation of the piezoelectric ceramic of the central portion 38. FIGS. 1 and 2 show the piezoelectric actuator 30 along the sectional plane A-A of FIG. 3. In this instance, the two movable portions 31, 32 of the mechanical actuator 30 that are shown in FIGS. 1 and 2 correspond to the two lateral portions 39.

As shown in FIG. 1, the first portion 31 of the mechanical actuator 30 is connected to the backlighting device 20 at a peripheral edge 21. The second portion 32 of the mechanical actuator 30, for its part, is connected to the façade glass 10 via a first connection element 40.

The first connection element 40 is fixed to the mechanical actuator 30 by way of a first portion, referred to as first arm 41. The first connection element 40 is fixed, for example adhesively bonded, to the façade glass 10 by way of a second portion, referred to as second arm 42.

The first connection element 40 is rigid so as to transmit the movement of the mechanical actuator 30 to the façade glass 10 without loss of energy. For example, the first connection element 40 may be made of plastic, for example nylon, or of metal.

In this instance, the first connection element 40 has a bracket-shaped profile along the XY plane of FIG. 1. This means that the first arm 41 and the second arm 42 form a right angle. This bracket-shaped profile makes it possible to have contact surfaces between the first connection element 40 and the façade glass 10 and between the first connection element 40 and the mechanical actuator 30 that are sufficient to provide effective fixation whilst still minimizing the bulk of the first connection element 40.

As shown in FIG. 1, the display device 1 comprises at least one second connection element 45 which is fixed to the façade glass 10, and at least one spring 35 which is in contact with the backlighting device 20, here at its peripheral edge 21, by way of a first end 36 and with the second connection element 45 by way of a second end 37.

In this instance, the second connection element 45 has a bracket-shaped profile. This bracket-shaped profile makes it possible to have contact surfaces between the second connection element 45 and the façade glass 10 and between the second connection element 45 and the spring 35 that are sufficient to provide effective fixation whilst still minimizing the bulk of the second connection element 45.

In the same way as for the mechanical actuator 30, the display device 1 described here comprises a single spring 35 and a single second associated element 45. Of course, the display device 1 may comprise multiple springs 35, for example one spring 35 per mechanical actuator 30. As a variant, it would be possible to provide that the spring 35 is replaced by another mechanical actuator, the deformation of which would oppose that of the mechanical actuator 30. The mechanical actuators could be forcibly joined around the image generation device to create a prestress.

The spring 35 has two ends 36, 37 that are movable with respect to one another: the first end 36 is in contact with the backlighting device 20, for example abuts it, and the second end 37 is in contact with, in this instance fixed to, the second connection element 45. As a variant, it would be possible to provide that the first end of the spring is also fixed to the backlighting device.

The spring 35 is disposed so as to prestress the mechanical actuator 30 and/or to bring the façade glass 10 to a position of equilibrium.

Here, the spring 35 is a flexible plate. As a variant, it would be possible to provide that the spring is a coiled metal rod.

The spring 35 and the mechanical actuator 30 are placed on either side of the backlighting device 20. In this instance, the spring 35 exerts a force which has a tendency to push the second connection element 45 back in relation to the backlighting device 20. In this way, the mechanical actuator 30 is prestressed between the first connection element 40 and the backlighting device 20. The prestress makes it possible to ensure there is no play at the mechanical actuator 30.

In addition, when the mechanical actuator 30 is moved and stretches out so as to displace the façade glass 10, the spring 35 exerts a return force which brings the façade glass 10 to a position of equilibrium. The position of equilibrium of the façade glass 10 is the position of the façade glass 10 when the mechanical actuator 30 is not in operation, that is to say when it is not supplied with electric current.

If the display device 1 comprises multiple mechanical actuators 30 and/or multiple springs 35, it would be possible, for example, to provide:
 one first connection element 40 per mechanical actuator 30 and one second connection element 45 per spring 35;
 a single connection element 40, 45 surrounding the entire peripheral edge 21 of the backlighting device 20;
 first connection elements 40 and/or second connection elements 45 connecting multiple mechanical actuators 30 and/or springs 35.

In this case, the display device 1 preferably comprises a first connection element 40 shared by the mechanical actuators 30 and a second connection element 45 shared by the springs 35.

As shown in FIG. 1, a protective element 50 is located between the façade glass 10 and the backlighting device 20. The protective element 50 is disposed on the periphery of the backlighting device 20. The protective element 50 is in contact with both the backlighting device 20, close to its peripheral edge 21, and the rear face 13 of the façade glass 10, over a portion of the rear face 13 that is not covered by the modulator 12.

The protective element 50 has a shape adapted to the periphery of the backlighting device 20. In this instance, for example, the protective element 50 has an annular overall shape and a rectangular cross section. Here, the dimensions of the protective element 50 in the YZ plane are greater than those of the modulator 12 and smaller than those of the backlighting device 20. In other words, the protective element 50 is a frame that surrounds the modulator 12.

Here, the protective element 50 is a foam, for example a polyester foam.

The protective element 50 is fixed, for example adhesively bonded, to the backlighting device 20. The protective element 50 slides on the façade glass 10 when it is moving. Conversely, as a variant, it would be possible to provide that the protective element is adhesively bonded to the façade glass and slides on the backlighting device.

The protective element 50 prevents dust possibly entering the gap between the backlighting device 20 and the modulator 12. The protective element 50 also prevents any light leaking out, for example light beams which would not pass through the modulator 12 and which could dazzle the user.

As shown in FIG. 2, the display device 1 may be supported by a structure 60. "Supported by the structure 60" is understood to mean that the display device 1 is kept secured to the structure 60, for example so as to be fixed overall in a frame of reference linked to the vehicle. The structure 60 is, for example, a portion of the dashboard of the vehicle. In this instance, the structure 60 forms a housing surrounding the backlighting device 20, the mechanical actuator 30, the spring 35 and the connection elements 40, 45, and is open at the façade glass 10.

The backlighting device 20 is fixed to the structure 60. In this instance, for example, screws 61 secure the backlighting device 20 to the structure 60.

The display device 1 comprises a flexible element designed to connect the façade glass 10 to the structure 60. The flexible element 70 is located between the structure 60 and the façade glass 10. The flexible element 70 is designed to enable the movement of the façade glass 10 in relation to the structure 60, and the façade glass 10 can thus be displaced by the mechanical actuator 30.

The flexible element 70 supports the façade glass 10. In other words, the flexible element 70 keeps the façade glass 10 in position in relation to the structure 60 and therefore in relation to the backlighting device 20 whilst still enabling the movement described above.

As a variant, it would be possible to provide that the façade glass is directly supported by the mechanical actuator and/or the spring in relation to the backlighting device. To that end, one or more mechanical actuators and one or more springs, specifically designed to ensure holding in place, could be distributed at the four corners of the display device. The mechanical actuator and/or the spring would then be fixed to the backlighting device. The flexible element and the structure would then no longer be necessary to hold the façade glass in place. The backlighting device could be directly fixed to a support, for example a vehicle dashboard.

The flexible element 70 has a shape adapted to the periphery of the façade glass 10. In this instance, for example, the flexible element 70 has an annular overall shape and a rectangular cross section. Here, the dimensions of the flexible element 70 in the YZ plane are smaller than those of the façade glass 10. In other words, the flexible element 70 is a frame which surrounds the backlighting device 20 and the connection elements 40, 45. The thickness of the flexible element 70, in this instance its dimension along the Y direction, is much smaller than its width and than its length, in this instance its dimensions in the reference plane XZ.

Here, the flexible element 70 is made of silicone.

To hold the façade glass 10 in place in relation to the structure 60, the flexible element 70 is fixed to both the structure 60 and the façade glass 10. The flexible element 70 is for example respectively adhesively bonded, using a glue or a resin, to the structure 60 and to the façade glass 10 via each of its two main faces.

The dimensions and the mechanical properties of the flexible element 70, for example its thickness and/or its Young's modulus, are determined such that the flexible element 70 can, for the one part, hold the façade glass 10 in place and, for the other part, deform whilst still staying in elastic regime when the mechanical actuator 30 moves the façade glass 10 in relation to the backlighting device 20 and therefore in relation to the structure 60.

For example, the stiffness of the flexible element 70 is between 5 and 50 N/mm, preferably between 5 and 25 N/mm. For example, the thickness of the flexible element 70 is between 0.2 mm and 3 mm, preferably between 0.2 mm and 1.5 mm.

In particular, the flexible element 70 is arranged so as to stay in an elastic deformation regime when the façade glass 10 undergoes an acceleration of at least 6 G and a displacement, for example in the reference plane XZ, of at least 100 micrometers in relation to the structure 60. The flexible element is therefore arranged so as not to undergo plastic deformation when the façade glass 10 is moving. In this context, an elastic deformation is a reversible deformation. The flexible element 70 returns to its initial shape after the façade glass 10 has moved.

As shown in FIG. 2, the display device 1 comprises at least one force sensor 80 designed to detect the contact of a user's finger on the front face 14 of the façade glass 10. Multiple force sensor technologies can be implemented in the display device 1. Thus, it would be possible to provide an inductive sensor, a resistive sensor or an optical sensor. In this instance, the one or more force sensors 80 are stress gages.

As shown in FIG. 2, two force sensors 80 are used here. It would be possible to provide that the display device 1 comprises more than two force sensors, for example four force sensors distributed at the corners of the display device 1.

Each force sensor 80 is designed to detect a displacement of the façade glass 10 out of the reference plane XZ. Each force sensor 80 is notably designed to measure a force exerted on the façade glass 10. In this instance, each force sensor 80 measures the component in the direction perpendicular to the reference plane XZ, i.e. here in the Y direction, of a force exerted on the façade glass 10.

Each force sensor 80 is calibrated to trigger the haptic feedback, that is to say the displacement of the façade glass 10 by the mechanical actuator 30, when the user exerts sufficient force on the façade glass 10. This makes it possible to avoid false detections. A triggering threshold for the haptic feedback can be calibrated by the user by virtue of dedicated software.

The force sensors 80 can also make it possible to locate the zone of contact between the user's finger and the façade glass 10, for example by triangulation.

As a variant, the contact zone is located by a dedicated transparent touch panel 15 of resistive or capacitive type. Such a touch panel 15 may for example comprise a layer of indium tin oxide.

As shown in FIG. 4, a touch panel 15 may be located between the façade glass 10 and the modulator 12. In this instance, two layers of optical adhesive 11 make it possible to respectively adhesively bond the touch panel 15 to the façade glass 10 and the touch panel 15 to the modulator 12. As a variant, the touch panel could be disposed on the façade glass 10, as external layer; then, reference could be made to a touch surface.

The two force sensors 80 are disposed between the façade glass 10 and the structure 60. The two force sensors 80 are disposed close to the flexible element 70. An elastomer support is located between the force sensor 80 and the structure 60. The elastomer support is for example adhesively bonded to the structure 60. The elastomer support is arranged so as to provide the force sensor 80 with a preload. In practice, the Shore hardness of this support is between 60 and 80 so as to efficiently transmit the movement of the façade glass 10 to the force sensor 80 and therefore have good sensitivity.

Here, the contact between each force sensor 80 and the façade glass 10 is sliding contact, so as to adapt to the displacements of the façade glass 10. As a variant, the contact could be provided by a double-sided adhesive tape.

A Teflon film 90 may be disposed at the surface of the backlighting device 20, on the portion of the backlighting device 20 that is in contact with the mechanical actuator 30. The Teflon film 90 allows the mechanical actuator 30 to slide against the backlighting device 20 with as little friction as possible.

Minimizing the friction can be useful, for example, when the user exerts a force on the façade glass 10. This is because this slightly displaces the façade glass 10, mainly in a direction orthogonal to the reference plane XZ, thereby also slightly displacing the mechanical actuator 30. By virtue of the Teflon film 90, the mechanical actuator 30 resists the displacement of the façade glass 10 only to a very little extent and therefore does not adversely affect the operation of the force sensors 80.

In addition, such a display device 1 may be designed with a total thickness of less than 15 mm. This enables its integration in numerous applications, such as a vehicle dashboard, or more generally a control screen for an electronic apparatus, for example an ultrasound scanner or a cash/ticket dispenser.

The invention claimed is:

1. A display device comprising:
 a façade glass;
 a backlighting device, which is configured to generate a source light beam;
 a modulator, which is secured to said façade glass and is located between said façade glass and said backlighting device so as to receive said source light beam and to transmit a modulated light beam through said façade glass;
 at least one mechanical actuator,
 wherein said mechanical actuator is disposed so as to be able to displace said façade glass in relation to said backlighting device;
 at least one second connection element fixed to said façade glass; and
 at least one spring which is in contact with said backlighting device by way of a first end and with said second connection element by way of a second end so as to prestress said mechanical actuator or to bring said façade glass to a position of equilibrium.

2. The display device as claimed in claim 1, further comprising a flexible element configured to connect said façade glass to a structure and for said façade glass to move in relation to said structure.

3. The display device as claimed in claim 2, wherein said flexible element is made of silicone.

4. The display device as claimed in claim 2, wherein said flexible element is arranged so as to stay in an elastic deformation regime when said façade glass undergoes an acceleration of 6 G and a displacement of 100 micrometers in relation to said structure.

5. The display device as claimed in claim 2, comprising at least one sensor that is disposed between said façade glass and said structure and is configured to measure a force exerted on said façade glass.

6. The display device as claimed in claim 1, further comprising a first connection element that is fixed to said mechanical actuator by way of a first portion and fixed to said façade glass by way of a second portion.

7. The display device as claimed in claim 6, wherein said first connection element has a profile forming two arms in the shape of a bracket, said mechanical actuator being fixed to a first arm and said façade glass being fixed to a second arm.

8. The display device as claimed in claim 1, wherein said mechanical actuator is a piezoelectric actuator.

9. The display device as claimed in claim 1, wherein said modulator is adhesively bonded to said façade glass by an optical adhesive.

10. The display device as claimed in claim 1, wherein said second connection element has a bracket-shaped profile.

11. The display device as claimed in claim 1, wherein a protective element is disposed on the periphery of said backlighting device, between said backlighting device and said façade glass.

12. The display device as claimed in claim 1, wherein said backlighting device comprises a casing made of magnesium.

13. The display device as claimed in claim 1, further comprising a friction reducing surface between said mechanical actuator and said backlighting device.

* * * * *